United States Patent [19]
Deutschel

[11] Patent Number: 5,263,731
[45] Date of Patent: Nov. 23, 1993

[54] COMPLIANT SPINDLE AND KNUCKLE ASSEMBLY FOR VEHICULAR SUSPENSION

[75] Inventor: Brian W. Deutschel, Sterling Heights, Mich.

[73] Assignee: General Motors Corporation, Detroit, Mich.

[21] Appl. No.: 996,248

[22] Filed: Dec. 23, 1992

[51] Int. Cl.⁵ .............................. B62D 7/06; B62D 7/16
[52] U.S. Cl. ........................................ 280/96.1; 403/131
[58] Field of Search ..................... 280/93, 96.1, 673; 301/126, 131, 132

[56] References Cited
U.S. PATENT DOCUMENTS
4,722,540 2/1988 Kozyra ............................. 280/93

Primary Examiner—Karin L. Tyson
Attorney, Agent, or Firm—A. Michael Tucker

[57] ABSTRACT

A "soft" knuckle for a vehicular suspension system provides additional compliance in the fore/aft, and vertical directions while maintaining desirable high stiffness in the lateral, steer and camber directions. The present spindle and knuckle assembly permit the kinematics and stiffness o a suspension system to maximize handling without compromising impact isolation. Thus, the present invention decouples handling and impact isolation requirements of a suspension system. The present invention can be adapted for both driven and undriven wheels, and thus can be used at any location in either a front or rear wheel drive vehicle.

7 Claims, 2 Drawing Sheets

COMPLIANT SPINDLE AND KNUCKLE ASSEMBLY FOR VEHICULAR SUSPENSION

BACKGROUND OF THE INVENTION

1. Field of the Invention

The present invention relates generally to vehicular suspensions, and in particular is concerned with a compliant spindle and knuckle assembly for mounting a wheel and tire.

2. Description of the Related Art

Conventional automotive wheels are mounted on rotatable hubs. A hub includes threaded wheel studs which receive nuts to secure a wheel and its tire to a vehicle. Oftentimes, a hub is mounted on a spindle extending from a knuckle. The knuckle rigidly connects the spindle to suspension linkage, steering linkage, and a brake caliper The spindle stiffness is determined by the suspension kinematics and the bushing stiffness of the suspension system.

Handling requirements of a suspension system dictate that the knuckle and its rigidly connected spindle have relatively high lateral, steer and camber stiffness. Providing for such stiffness in the desired directions results in relatively high stiffness in the remaining directions, i.e. the fore/aft and vertical directions, in conventional suspension systems.

The art continues to seek improvements. It is desirable to provide a knuckle and spindle arrangement capable of independently tuning fore/aft and vertical directions from lateral, steer and camber directions. Such an arrangement will produce improved handling and impact isolation in a suspension system.

SUMMARY OF THE INVENTION

The present invention includes a "soft" knuckle for a vehicular suspension system that provides desirable compliance in the fore/aft and vertical directions while maintaining desirable high stiffness in the lateral, steer and camber directions. The present spindle and knuckle assembly permits the kinematics and stiffness of a suspension system to maximize handling without compromising impact isolation. Thus, the present invention decouples handling and impact isolation requirements of a suspension system. The present invention can be adapted for both driven and undriven wheels, and thus can be used at any location of a front, rear or all-wheel drive vehicle.

In a preferred embodiment, a spindle and knuckle assembly for mounting a vehicular wheel includes a base having a spindle received through an opening in a knuckle so that an axis of the spindle is eccentric to a central axis of the opening. A bearing assembly is provided between the base and the knuckle. A platform, mounted to the base opposite the spindle, includes a pair of eyelets, each having an elastomeric bushing. Bolts are used to secure the platform to the knuckle. Fore/aft and vertical loads to the spindle cause the platform to pitch and provide compliance.

BRIEF DESCRIPTION OF THE DRAWINGS

FIG. 3 is an exploded perspective view of the spindle and knuckle assembly of FIGS. 1 and 2 with the hub and bearing assembly exploded away from the spindle.

FIG. 4 is a perspective view of the assembled spindle and knuckle assembly of FIGS. 1, 2 and 3 illustrating the rotation of the spindle due to a force Fs.

DETAILED DESCRIPTION OF THE PREFERRED EMBODIMENT

Figure 1:
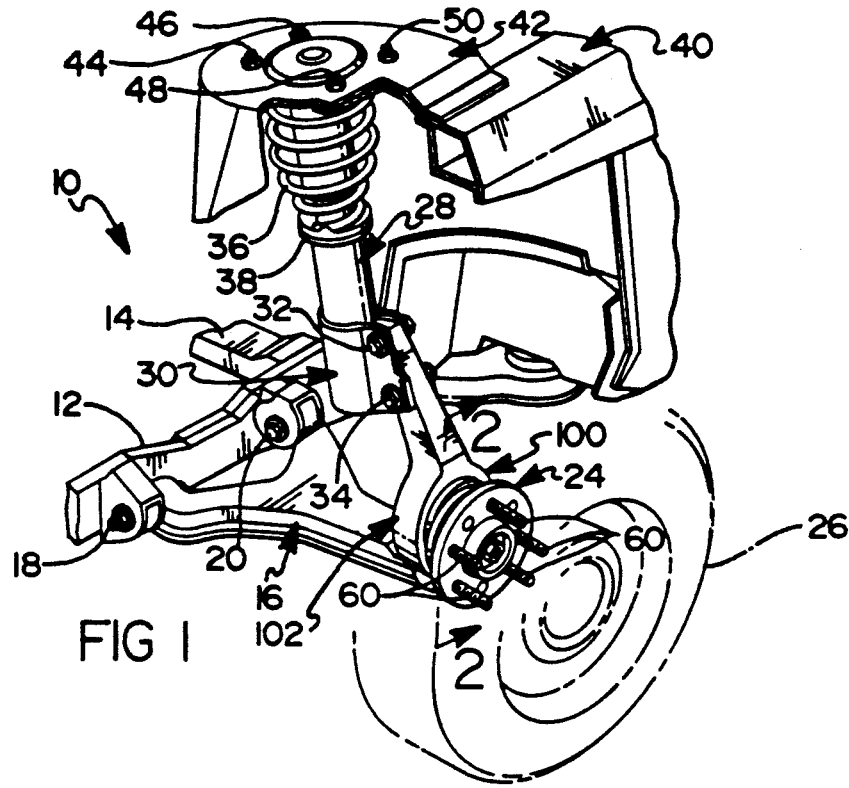
FIG. 1 is a perspective view of a hydraulic damper mounted to a preferred embodiment of the present spindle and knuckle assembly in a front suspension system wherein steering linkages and a brake caliper have been removed for clarity of illustration.

A vehicular suspension system is indicated generally at 10 in FIG. 1. A longitudinal suspension support 12 is secured to or formed as part of the vehicular chassis. A transverse cross member 14 spans the width of the chassis to another longitudinal suspension support (not illustrated) in a well-known manner. A control arm 16 is pivotally connected to the suspension support 12 by a pair of threaded bolts 18 and 20 secured by respective nuts which act as pivot axes. Each bolt 18 and 20 preferably includes an elastomeric bushing (not illustrated) to isolate the control arm 14 from the suspension support 12.

Figures 3, 4:
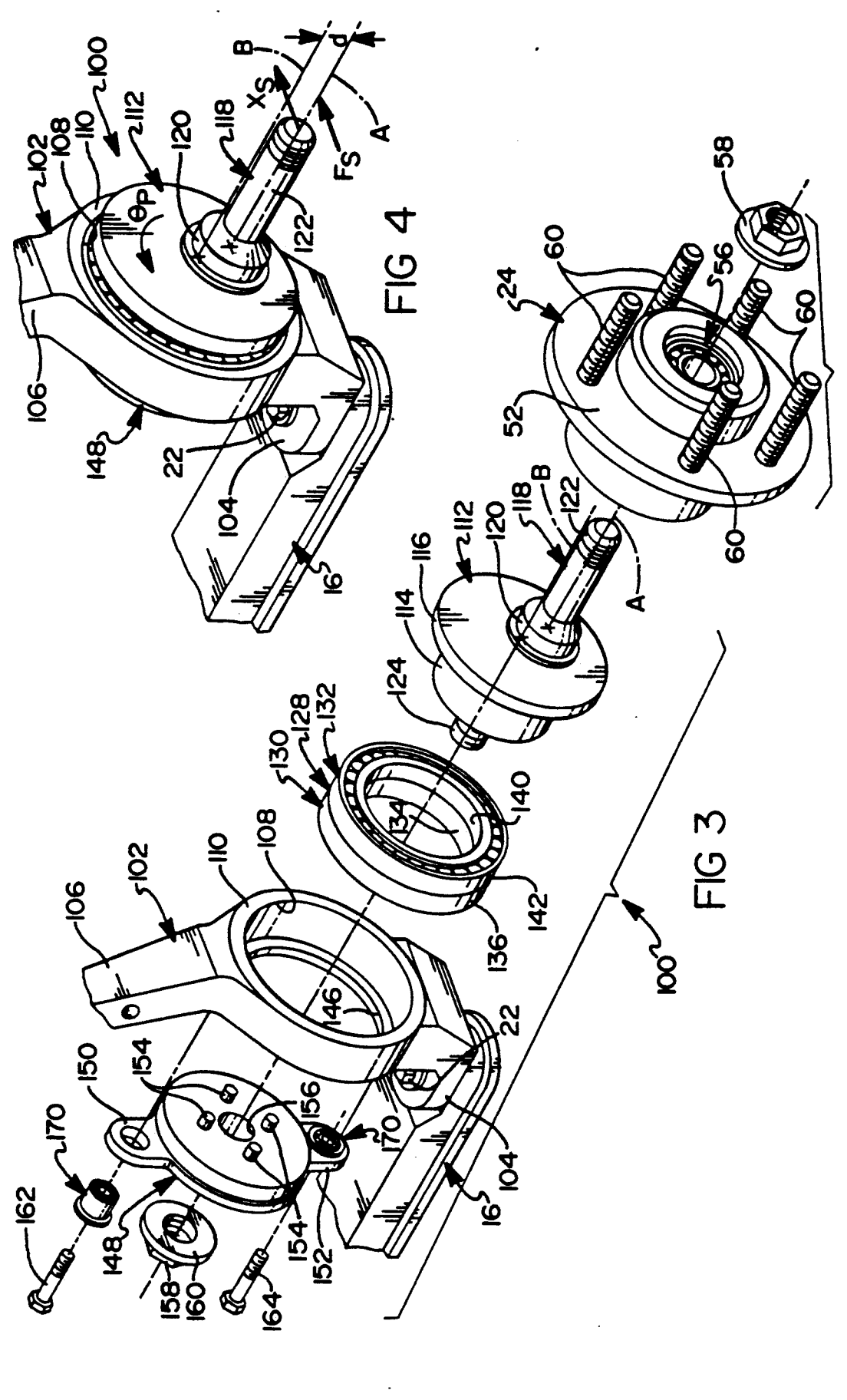

A spindle and knuckle assembly 100 is pivotally mounted on a conventional ball joint (not illustrated) on the control arm 16 and retained by a nut 22 (FIGS. 3 and 4). The spindle and knuckle assembly 100 rotatably mounts a hub and bearing assembly 24, which in turn mounts a wheel and tire illustrated in phantom at 26.

A hydraulic damper 28, illustrated as a strut, is received at its lower end in a bracket 30, which is secured to spindle and knuckle assembly 100 by threaded bolts 32 and 34 and respective nuts. A suspension spring 36 is seated on a lower spring seat 38 and provides a spring force upwardly against a vehicular body 40. The upper end of the damper 28 is secured to a mounting tower 42 formed in the body 40 by an elastomeric mount assembly not illustrated) to isolate the damper 28 from the body 40. A plurality of threaded bolts 44, 46, 48, and 50 and respective nuts secure the mount assembly to the mounting tower 42.

Figure 2:
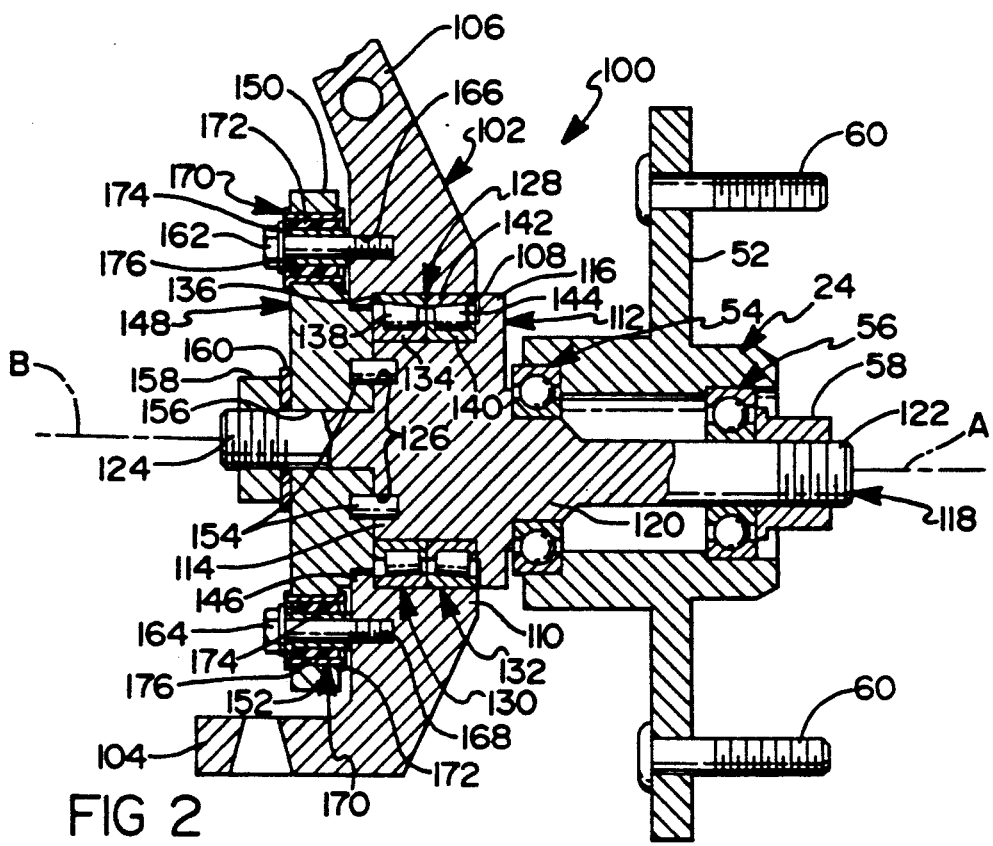
FIG. 2 is a sectional view of the spindle and knuckle assembly and hub and bearing assembly taken along line 2—2 of FIG. 1 and removed from the suspension system of FIG. 1 for purposes of clarity of illustration.

A preferred embodiment of the spindle and knuckle assembly 100 mounting the hub and bearing assembly 24 is illustrated in FIGS. 2 and 3, removed from the system 10 of FIG. 1 for clarity of illustration. The assembly 100 includes a steering knuckle 102 having a lower flange 104 and an upper flange 106. As seen best in FIGS. 3 and 4, the lower flange 104 is pivotally mounted on the ball joint (not illustrated) on the control arm 16 and retained by the nut 22. The upper flange 106 receives bolts 32, 34 to secure the mounting bracket 30. A central opening 108 is provided in a collar 110 formed between the flanges 104, 106.

A base 112 includes a reduced-diameter, annular neck 114 adjoining an annular flange 116. A tapered spindle 118 having a large diameter portion 120 and a threaded small diameter portion 122 projects substantially perpendicularly from an outer surface of the annular flange. A threaded mounting shaft 124 projects substantially perpendicularly from an inner surface of the neck 114. A plurality of openings 126 are Circumferentially spaced about the mounting shaft 124 in the inner surface of the neck 114. The spindle 118 is formed eccentrically on the base 112 so that an axis A of the spindle 118 is offset a predetermined distance d (FIG. 4) from a central axis B passing through the mounting shaft 124 and the assembly 100.

A bearing assembly 128, illustrated as first and second tapered bearing packs 130, 132, includes first inner and outer races 134, 136 housing tapered roller bearings 138 and second inner and outer races 140, 142 housing tapered roller bearings 144. The bearing assembly 128 is fitted onto the neck 114 of the base 112 against the flange 116, and then the bearing assembly 128 and base 112 are received in the opening 108 of the knuckle 102 and seated against an annular rim 146 on the knuckle 102. As described below, the base 112 and spindle 118 rotate through a limited range on the bearing assembly 128 with respect to the knuckle 102.

A platform 148 includes diametrically-opposed eyelets 150 and 152. A plurality of lock pins 154 project from an outer surface of the platform 148 and are received in respective openings 126 in the neck 114 as the platform 148 is placed against the knuckle 102. A central opening 156 in the platform 148 aligned with axis B receives the mounting shaft 124. A nut 158 and washer 160 are threaded onto the mounting shaft 124 to retain the platform 148 against the base 102.

The combined platform 148 and base 112 are mounted to the knuckle 102 as threaded bolts 162 and 164 are received in complementary openings 166 and 168 in an inner surface of the knuckle 102. An elastomeric bushing 170, preferably formed as an annular rubber element 172 having inner and outer sleeves 174 and 176, is inserted in each eyelet 150 and 152 to receive a respective bolt 162 and 164. As described below, the bushings 170 permit slight rotation of the combined platform 148 and base 112 on the bearing assembly 128 to provide a compliant mount.

The hub and bearing assembly 24 includes a hub 52 rotatably mounted on the spindle 118 by first and second roller bearing packs 54 and 56. A nut 58 is threaded onto the spindle 118 to retain the hub 52 on the spindle 118. A plurality of wheel studs 60 projects substantially perpendicularly from an outer surface of the hub 52 to receive a road wheel in a conventional manner.

As a road wheel receives inputs during driving, the bearing assembly 128 provides a rigid connection between the platform 148 and the knuckle 102 in all directions except for pitch about the central axis B. The elastomeric bushings 170 provided in the eyelets 150, 152 of the platform 148 are radially spaced from the central axis B. The pitch stiffness of the platform 148 is determined by the radial spacing and stiffness of the bushings 170.

Since the spindle 118 is not aligned with the central axis B, any fore/aft or vertical load will cause the platform 148 to pitch. The amount of fore/aft and vertical movement of the spindle 118 is determined by the amount of vertical and fore/aft offset between the spindle 118 and the pitch stiffness of the platform 148.

An example of the reaction of the spindle 118 to a force is illustrated in FIG. 4. A force Fs will cause rotation of the spindle 118 indicated by arrow θp. The magnitude of θp is determined by the offset d of the spindle axis A from the central axis B and the stiffness of the bushings 170.

It is appreciated the present arrangement of mounting a spindle 118 offset from a central axis B can be adapted for a driver wheel. For example, a driver spindle can be inserted through an opening through the platform, wherein the opening centerline is offset from the centerline of the platform. The platform can then be mounted with similar bushings and bolts to a knuckle.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A knuckle and spindle assembly for mounting a vehicular wheel, comprising:
   (a) a spindle;
   (b) a knuckle having an opening receiving the spindle;
   (c) bearing means provided between the spindle and knuckle, and
   (d) means for yieldably attaching the spindle to the knuckle.

2. The assembly specified in claim I wherein the means for yieldably attaching the spindle includes:
   (a) a platform having circumferential eyelets;
   (b) an elastomeric bushing in each eyelet; and
   (c) a fastener inserted through each bushing and secured to the knuckle.

3. The assembly specified in claim 1 wherein an axis of the spindle is offset from an axis of the opening in the knuckle.

4. A spindle assembly providing fore/aft and vertical isolation of a road wheel, comprising:
   (a) a knuckle having an opening;
   (b) means for mounting the knuckle to a vehicular body;
   (c) a base having a neck received in the opening of the knuckle;
   (d) bearing means between the neck and the knuckle;
   (e) a spindle projecting from the base along an axis parallel to a central axis of the base;
   (f) a platform having at least a pair of circumferential eyelets;
   (g) an elastomeric bushing in each eyelet;
   (h) fastener means inserted through each bushing and secured to the knuckle; and
   (i) means for securing the base to the platform.

5. The assembly specified in claim 4 wherein the means for securing the base to the platform includes a mounting shaft projecting from the base.

6. A vehicular suspension system comprising:
   (a) a hub for mounting a wheel and tire;
   (b) means for rotatably mounting the hub on a spindle, wherein the spindle defines a first axis;
   (c) means for rotating the spindle with respect to a knuckle; and
   (d) platform means for compliantly attaching the spindle to the knuckle, wherein the platform means defines a second axis parallel to the first axis.

7. The system specified in claim 6 wherein:
   (a) the knuckle includes an opening;
   (b) the spindle projects from a base received in the knuckle opening;
   (c) a bearing assembly is provided between the base and the knuckle;
   (d) the platform means includes at least two circumferential eyelets lined with elastomeric bushings; and
   (e) fasteners inserted through the bushings and secured to the knuckle.

* * * * *